(12) United States Patent
Gupta et al.

(10) Patent No.: US 11,501,308 B2
(45) Date of Patent: Nov. 15, 2022

(54) METHOD AND SYSTEM FOR FACILITATING DATA SECURITY FOR TRANSACTION DATA

(71) Applicant: MASTERCARD INTERNATIONAL INCORPORATED, Purchase, NY (US)

(72) Inventors: Raju Kumar Gupta, Pune (IN); Sagar Rajendra Tadalgi, Solapur (IN); Sadaf Patel, Pune (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 17/147,245

(22) Filed: Jan. 12, 2021

(65) Prior Publication Data

US 2021/0224806 A1     Jul. 22, 2021

(30) Foreign Application Priority Data

Jan. 20, 2020   (IN) ............................. 202021002456

(51) Int. Cl.
*G06Q 20/38* (2012.01)
*G06Q 20/40* (2012.01)
*G06Q 20/34* (2012.01)
*G06F 21/62* (2013.01)

(52) U.S. Cl.
CPC ....... *G06Q 20/405* (2013.01); *G06F 21/6218* (2013.01); *G06Q 20/34* (2013.01); *G06F 21/6245* (2013.01)

(58) Field of Classification Search
None
See application file for complete search history.

(56) References Cited

U.S. PATENT DOCUMENTS 10,721,226 B1 *   7/2020  Kurani ................ H04L 63/0853
2013/0054977 A1 * 2/2013  Basmov .............. G06F 21/6218
                                                            713/189

\* cited by examiner

*Primary Examiner* — Joseph W. King
(74) *Attorney, Agent, or Firm* — Pillsbury Winthrop Shaw Pittman LLP

(57) ABSTRACT

A method for facilitating data security for transaction data includes receiving, by a first transaction processing server, a transaction message for a transaction. The transaction message includes a plurality of data elements indicative of the transaction data of the transaction. The first transaction processing server identifies a set of data elements of the plurality of data elements that is to be in a state of compliance with a set of rules. The first transaction processing server modifies a first data element of the plurality of data elements to include a bitmap mapped to the set of data elements. The first transaction processing server communicates the transaction message having the modified first data element to a second transaction processing server for processing the transaction. The second transaction processing server identifies the set of data elements that is to be in the state of compliance based on the first data element.

18 Claims, 11 Drawing Sheets

METHOD AND SYSTEM FOR FACILITATING DATA SECURITY FOR TRANSACTION DATA

RELATED APPLICATIONS

This application claims priority to Indian Application Serial No. 202021002456, filed Jan. 20, 2020, which is incorporated herein by reference in its entirety.

FIELD

Various embodiments of the disclosure relate generally to methods and systems for processing transactions. More particularly, various embodiments of the present disclosure relate to a method and a system for facilitating data security for transaction data.

BACKGROUND

Recent times have seen a proliferation of transactions involving transaction cards (i.e., card-based transactions). Trends on transaction card usage and technological advancements in the payment industry (e.g., virtual transaction cards) point towards rapid expansion of transaction card usage in the future. Such transactions often involve exchanging of transaction messages, containing sensitive financial information, between various parties such as merchants, acquirers, payment networks, and issuers. Exchange and storage of these transaction messages are governed by strict information technology security standards such as the Payment card industry data security standard (PCI DSS). These information technology security standards include rules and guidelines for identification, storage, and transmission of this sensitive financial information.

However, no single source exists for identifying the rules and guidelines mandated by these information technology security standards. Organizations (e.g., merchants or financial institutions) may be required to discern relevant information from various sources (e.g., technical guidelines, websites, technical specifications, or the like), warranting unnecessary expenditure of time and efforts. Further, different organizations may draw different conclusions on data security from these various sources, leading to lack of uniformity on data security. Organizations that fail to maintain data security standards that conform to these rules and guidelines run a risk of attracting substantial penalties.

In light of the above, there is a need for a technical solution that facilitates easier and effortless adherence to the data security standards in the payment industry.

SUMMARY

In an embodiment of the present disclosure, a method for facilitating data security for transaction data is provided. The method includes receiving, by a first transaction processing server, a transaction message for a transaction. The transaction message includes a plurality of data elements that are indicative of the transaction data of the transaction. A set of data elements of the plurality of data elements that is to be in a state of compliance with a set of rules is identified by the first transaction processing server. A first data element of the plurality of data elements is modified by the first transaction processing server to include a bitmap mapped to the set of data elements. The first data element is exclusive of the set of data elements and the bitmap is indicative of the set of data elements that is to be in the state of compliance with the set of rules. The transaction message having the modified first data element is communicated by the first transaction processing server to a second transaction processing server for processing the transaction. The set of data elements that is to be in the state of compliance with the set of rules is identified by the second transaction processing server based on the modified first data element.

In another embodiment of the present disclosure, a system for facilitating data security for transaction data is provided. The system includes a first transaction processing server configured to receive a transaction message for a transaction. The transaction message includes a plurality of data elements that are indicative of the transaction data of the transaction. The first transaction processing server identifies a set of data elements of the plurality of data elements that is to be in a state of compliance with a set of rules. The first transaction processing server modifies a first data element of the plurality of data elements to include a bitmap mapped to the set of data elements. The first data element is exclusive of the set of data elements and the bitmap is indicative of the set of data elements that is to be in the state of compliance with the set of rules. The first transaction processing server communicates the transaction message having the modified first data element to a second transaction processing server for processing the transaction. The set of data elements that is to be in the state of compliance with the set of rules is identified by the second transaction processing server based on the modified first data element.

In another embodiment of the present disclosure, a method for facilitating data security for transaction data is provided. The method includes receiving, by a payment network server, a transaction message for a transaction. The transaction message includes a plurality of data elements that are indicative of the transaction data of the transaction. A set of data elements of the plurality of data elements that is to be in a state of compliance with a payment card industry data security standard (PCI DSS) is identified by the payment network server. A first data element of the plurality of data elements is modified by the payment network server to include a bitmap mapped to the set of data elements. The first data element is exclusive of the set of data elements and the bitmap is indicative of the set of data elements that is to be in the state of compliance with the PCI DSS. The transaction message having the modified first data element is communicated by the payment network server to a transaction processing server for processing the transaction. The set of data elements that is to be in the state of compliance with the PCI DSS is identified by the transaction processing server based on the modified first data element.

BRIEF DESCRIPTION OF THE DRAWINGS

Various embodiments of the present disclosure are illustrated by way of example, and not limited by the appended figures, in which like references indicate similar elements, and in which.

Figure 1:
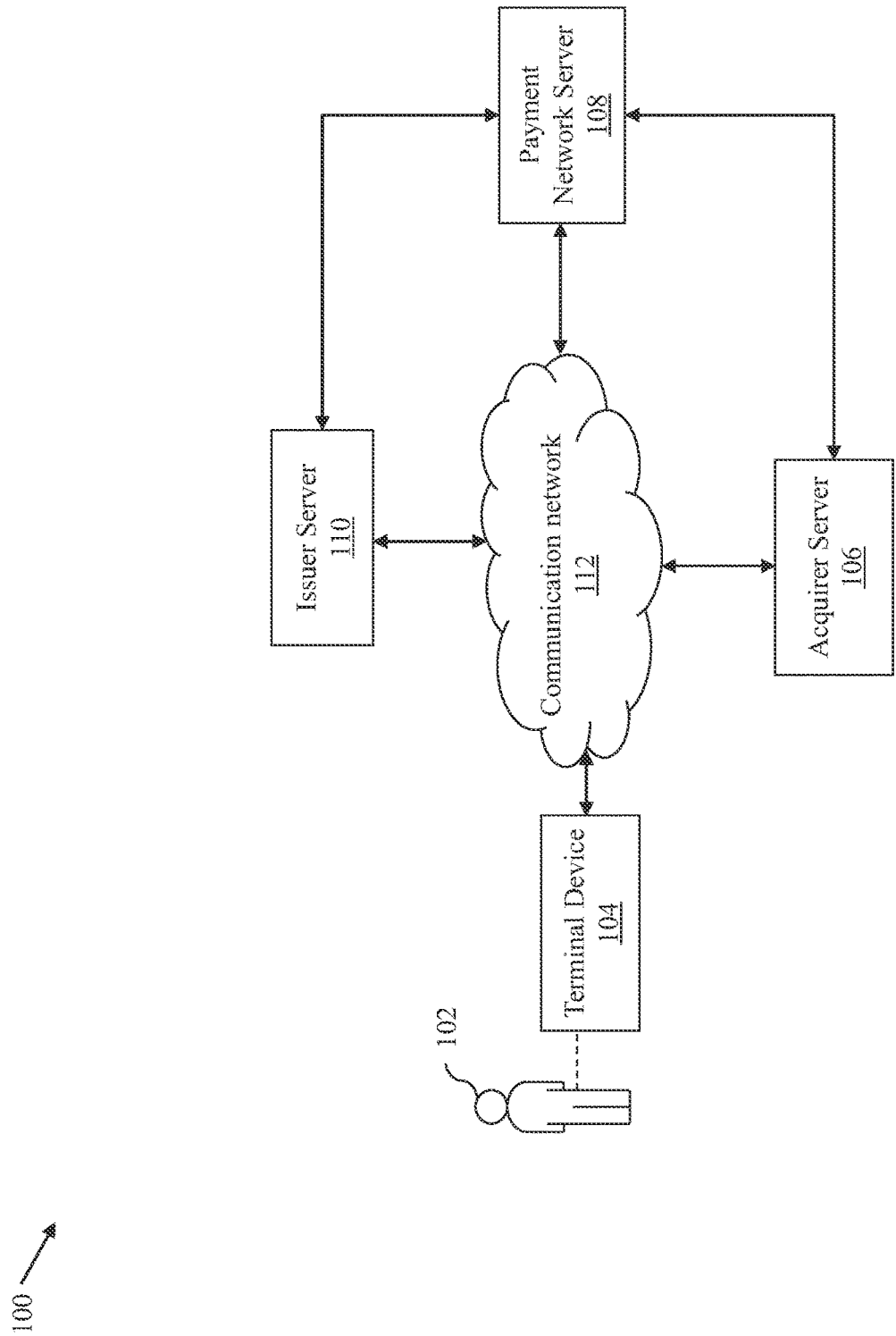
FIG. 1 is a block diagram that illustrates an exemplary environment for facilitating data security for transaction data, in accordance with an exemplary embodiment of the present disclosure.

Further areas of applicability of the present disclosure will become apparent from the detailed description provided hereinafter. It should be understood that the detailed description of exemplary embodiments is intended for illustration purposes only and is, therefore, not intended to necessarily limit the scope of the present disclosure.

DETAILED DESCRIPTION

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. In one example, the teachings presented and the needs of a particular application may yield multiple alternate and suitable approaches to implement the functionality of any detail described herein. Therefore, any approach may extend beyond the particular implementation choices in the following embodiments that are described and shown.

References to "an embodiment", "another embodiment", "yet another embodiment", "one example", "another example", "yet another example", "for example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Overview

Card-based transactions involve exchange of transaction messages, containing sensitive financial information, between various parties such as merchants, acquirers, payment networks, and issuers. Exchange and storage of these transaction messages are governed by strict information technology security standards. However, no single source exists for identifying the rules and guidelines mandated by these information technology security standards. Organizations expend significant time and efforts in identifying and implementing these rules and guidelines, which is undesirable.

Various embodiments of the present disclosure provide a method and a system that solve the abovementioned problem by providing a solution that facilitates easy and effortless adherence to data security standards in the payment industry. Thus, the system of the present disclosure includes a first transaction processing server that identifies, in transaction messages, data elements that are to be compliant with requisite information technology security standards. The first transaction processing server may include, but is not limited to, an acquirer server, a payment network server, an issuer server, or the like. The first transaction processing server may receive a transaction message for a transaction (e.g. a payment transaction made by a user using a transaction card). The transaction message may include various data elements that are indicative of transaction data of the transaction. The transaction data may include a transaction card number of the transaction card, an expiry date of the transaction card, a merchant category code, or the like.

A set of rules (e.g., payments card industry data security standards, PCI DSS) may classify one or more data elements as sensitive information that warrants certain minimum levels of security. The first transaction processing server may identify the one or more data elements that are required to be in a state of compliance with the set of rules. Following the identification, the first transaction processing server may modify a first data element, exclusive of the one or more data elements, to include a bitmap that is mapped to the one or more data elements. The bitmap may indicate the one or more data elements that are to be in the state of compliance with the set of rules.

Following the modification of the first data element, the first transaction processing server may execute an operation (e.g., a masking operation, an encryption operation, an obfuscation operation, or the like) for modifying the one or more data elements to ensure compliance with the set of rules. The first transaction processing server may communicate the transaction message having the modified first data element to a second transaction processing server (e.g., the acquirer server, the payment network server, or the issuer server) for processing the transaction. The second transaction processing server may identify the one or more data elements that are to be in the state of compliance, based on the first data element. The second transaction processing server may process the transaction following the identification of the one or more data elements.

Thus, the method and system of the present disclosure provide a method of facilitating data security for transaction data, enabling easy and effortless adherence to data security standards in the payment industry.

Terms Description (in Addition to Plain and Dictionary Meaning)

Transaction processing server is a server of an entity (e.g., an acquirer, a payment network, or an issuer) that is associated with a transaction performed by a user. For example, the transaction processing server may be an acquirer server of an acquirer, a payment network server of a payment network, or an issuer server of an issuer that is involved in a transaction.

Data elements refer to distinct fields of a transaction message. The data elements are indicative of transaction data of a transaction that corresponds to the transaction message. In one example, a transaction message that is based on ISO8583 message format may include multiple data elements that store transaction data such as a transaction card number of a transaction card used for the transaction, an amount of the transaction, a card verification value, a personal identification number of the transaction card, an expiry date of the transaction card, or the like. In the transaction message, a first data element, which is a reserved or unused data element, is used to indicate a set of data elements that is to be compliant with a data security standard (e.g., Payment card industry data security standard, PCI DSS). The first data element includes a bitmap that is indicative of the set of data elements.

Set of rules refers to various guidelines mandated by an information technology security standard (e.g., PCI DSS) for dealing with information included in a transaction message. For example, a first rule may indicate that, prior to transmission of a transaction message or storage of information indicated by the transaction message, a data element that includes a transaction card number is to be encrypted.

State of compliance refers to whether one or more data elements of a transaction message are compliant with a set of rules (e.g., PCI DSS). The one or more data elements are said to be compliant with the set of rules when each of the one or more data elements conforms to guidelines mandated by the set of rules.

Bitmap is a field or a sub-field within a transaction message that is indicative of a usage of one or more data elements in the transaction message. For example, a bitmap in a transaction message may indicate which of first through sixty fourth data elements of a transaction message are being used. Another bitmap in the transaction message may indicate which of the first through sixty fourth data element are to be in a state of compliance with a set of rules.

Server is a physical or cloud data processing system on which a server program runs. The server may be implemented in hardware or software, or a combination thereof. In one embodiment, the server may be implemented in computer programs executing on programmable computers, such as personal computers, laptops, or a network of computer systems. The server may correspond to one of an acquirer server, a payment network server, or an issuer server.

FIG. 1 is a block diagram that illustrates an exemplary environment 100 for facilitating data security for transaction data, in accordance with an exemplary embodiment of the present disclosure. The environment 100 includes a user 102, a terminal device 104, an acquirer server 106, a payment network server 108, and an issuer server 110. The terminal device 104, the acquirer server 106, the payment network server 108, and the issuer server 110 may communicate with each other by way of a communication network 112 or through separate communication networks established therebetween.

The user 102 is an individual, who is associated with a payment mode. In one example, the payment mode may be a transaction card linked to a payment account of the user 102 that is maintained at a financial institution, such as an issuer. Examples of the transaction card may include, but are not limited to, a debit card, a credit card, or a prepaid card. The payment mode may be utilized by the user 102 to purchase products and/or avail services from a merchant.

The terminal device 104 is an electronic device that facilitates transactions. In one example, the terminal device 104 is a point-of-sale (POS) device, associated with a first merchant. In such a scenario, the terminal device 104 may facilitate purchase of products and/or services by the user 102 from the first merchant. In another example, the terminal device 104 may be an automated teller machine (ATM) that allows the user 102 to access banking services (e.g., cash withdrawals, cash deposits, or the like) offered by the issuer or an acquirer associated with the terminal device 104. Other examples of the terminal device 104 may include, but are not limited to, a point-of-purchase (POP) device, a point-of-interaction (POI) device, a currency recycler, a bunch note acceptor, a computing device for accessing a payment gateway, or the like.

The acquirer server 106 is a computing server (i.e., transaction processing server) which includes suitable logic, circuitry, interface, and/or code, executable by the circuitry, for processing transactions. The acquirer server 106 is operated by an acquirer associated with the terminal device 104. The acquirer may be a financial institution that manages merchant accounts of various merchants such as the first merchant. The acquirer server 106 may store details corresponding to a merchant account of the first merchant. Details of payment accounts established with the acquirer may be stored as account profiles. For example, the acquirer server 106 may store an account number of the merchant account, a history of transactions conducted using the merchant account, or the like.

The payment network server 108 is a computing server (i.e., another transaction processing server), which includes suitable logic, circuitry, interface, and/or code, executable by the circuitry, for processing transactions that are performed using transaction cards. The payment network server 108 is operated by a payment network (i.e., a payment interchange). The payment network server 108 represents an intermediate entity between the acquirer server 106 and the issuer server 110 for processing the transactions.

The issuer server 110 is a computing server (i.e., another transaction processing server), which includes suitable logic, circuitry, interface, and/or code, executable by the circuitry, for processing transactions. The issuer server 110 is operated by the issuer. The issuer may be a financial institution that manages payment accounts of multiple users (such as the user 102). Details of the payment accounts established with the issuer may be stored as account profiles. Each account profile may be indicative of a transaction history of a corresponding user. For example, a first account profile of the user 102 may be indicative of a transaction history of the user 102. The issuer server 110 may credit and debit the payment accounts based on transactions made by the users from their corresponding payment accounts. In a non-limiting example, the issuer server 110 may issue the transaction card to the user 102. The transaction card may be associated with the payment account of the user 102.

Examples of the acquirer server 106, the payment network server 108, and the issuer server 110 may include, but are not limited to, computers, laptops, mini-computers, mainframe computers, any non-transient and tangible machines that can execute a machine-readable code, cloud-based servers, distributed server networks, a network of computer systems, or a combination thereof.

In operation, the user 102 may initiate a transaction at the terminal device 104 (e.g., a POS device) using the transaction card for purchasing one or products and/or availing one or more services from the first merchant. The terminal device 104 may communicate, to the acquirer server 106, a transaction message for processing the transaction. The transaction message may be an authorization request for the transaction initiated by the user 102. The transaction message may conform to a standard message format such as, but not limited to, ISO8583, and may include various data elements such that each data element is indicative of transaction data of the transaction. For example, a data element included in the transaction message may indicate a transaction card number of the transaction card. Another data element may indicate a merchant category code of the first merchant. Another data element may be indicative of a transaction amount of the transaction.

The acquirer server 106 may identify a set of data elements in the transaction message that is to be in a state of compliance with a set of rules. The set of rules may pertain to one or more information technology security standards associated with the payment industry. In a non-limiting example, the set of rules may pertain to a payment card industry data security standard (commonly known as 'PCI DSS'). The PCI DSS, as is known to those of skill in the art, is a set of rules and/or guidelines that mandate creation of an additional layer of security for protecting data associated with transaction cards. Thus, ensuring requisite levels of security for storing, processing, and/or transmission of data pertaining to the users (e.g., the user 102) and their transaction cards. Based on the identification, the acquirer server 106 may modify the identified set of data elements to ensure that each of the set of data elements is compliant with the set of rules. For the modification, the acquirer server 106 may execute one of a masking operation, an encryption operation, or an obfuscation operation to ensure that the set of data elements is in the state of compliance with the set of rules.

The acquirer server 106 may further modify a first data element in the transaction message to include a bitmap that is mapped to the set of data elements. The first data element is exclusive of the set of data elements. For example, the first data element may be a reserved data element that remains unused until it is modified by the acquirer server 106. The bitmap may be indicative of the set of data elements that is to be in the state of compliance with the set of rules. The acquirer server 106 may communicate, to the payment network server 108, the transaction message with the modified first data element and the modified set of data elements. Based on the first data element, the payment network server 108 may identify the set of data elements that is to be compliant with the set of rules. The payment network server 108 may process the transaction based on the identification. Consequently, the payment network server 108 may communicate the transaction message having the modified first data element to the issuer server 110 for further processing. Similar to the payment network server 108, the issuer server 110 may identify the set of data elements that is to be compliant with the set of rules based on the first data element. Consequently, the issuer server 110 may process the transaction for approval or denial. In a non-limiting example, the issuer server 110 may authorize the transaction. Processing of the transaction by the issuer server 110 is explained in conjunction with FIGS. 2A-2C. Methods for processing transactions via the acquirer server 106, the payment network server 108, and the issuer server 110 will be apparent to a person of ordinary skill in the art and may include processing the transaction via the traditional four-party system or the traditional three-party system.

In the foregoing description, it is assumed that the acquirer server 106 identifies the set of data elements and modifies the first data element to include the bitmap mapped to the set of data elements. However, in another embodiment, any of the payment network server 108 and the issuer server 110 may perform the abovementioned operations in lieu of the acquirer server 106 without deviating from the scope of the disclosure.

The communication network 112 is a medium through which content and messages are transmitted between the terminal device 104, the acquirer server 106, the payment network server 108, and the issuer server 110. Examples of the communication network 112 include, but are not limited to, a Wi-Fi network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and combinations thereof. Various entities in the environment 100 may connect to the communication network 112 in accordance with various wired and wireless communication protocols, such as Transmission Control Protocol and Internet Protocol (TCP/IP), User Datagram Protocol (UDP), Long Term Evolution (LTE) communication protocols, or any combination thereof.

Figure 2A:
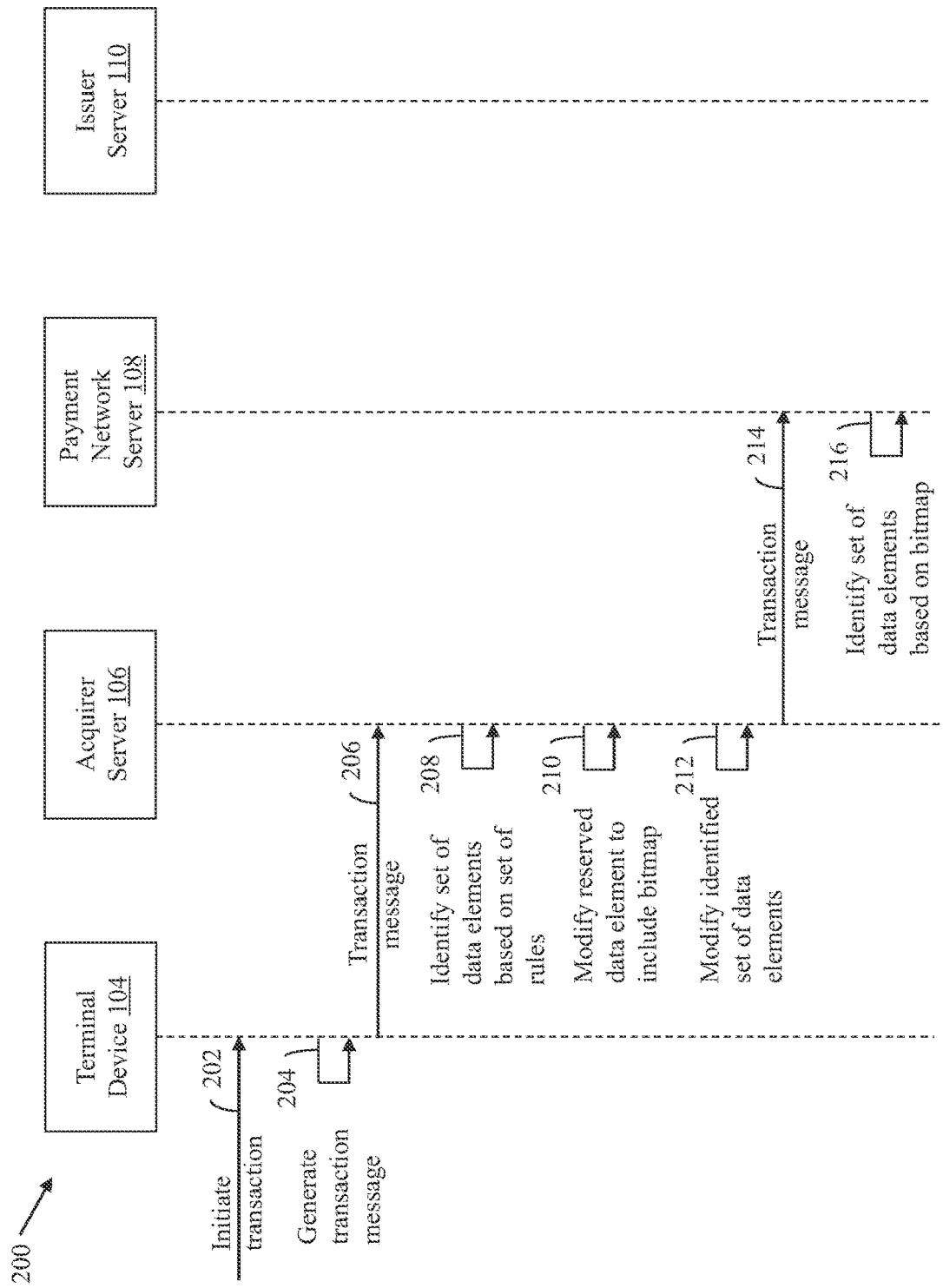
FIGS. 2A, 2B, and 2C, collectively represent a process flow diagram that illustrates an exemplary scenario for facilitating data security for transaction data, in accordance with an exemplary embodiment of the present disclosure.
Figure 2B:
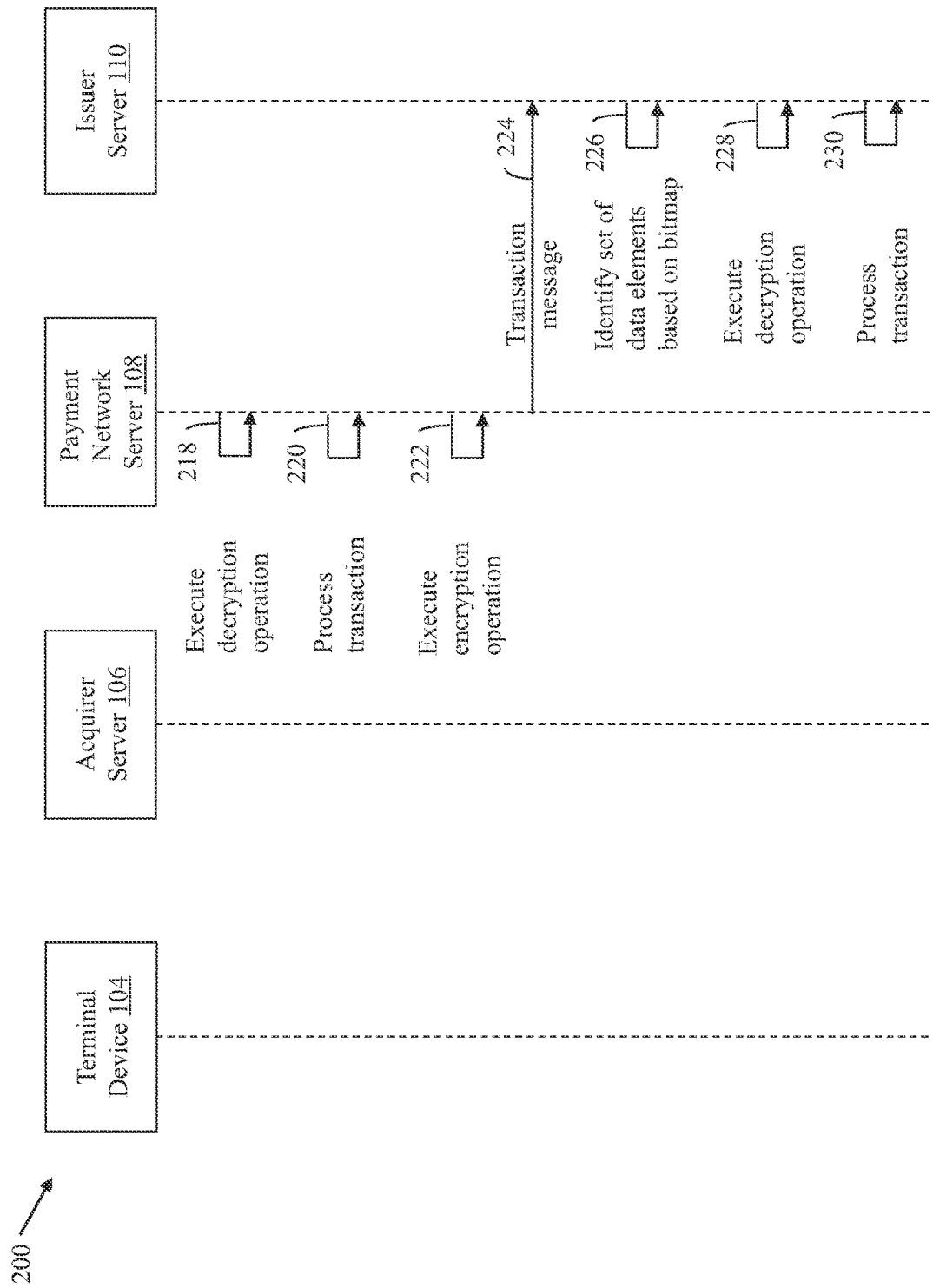
Figure 2C:
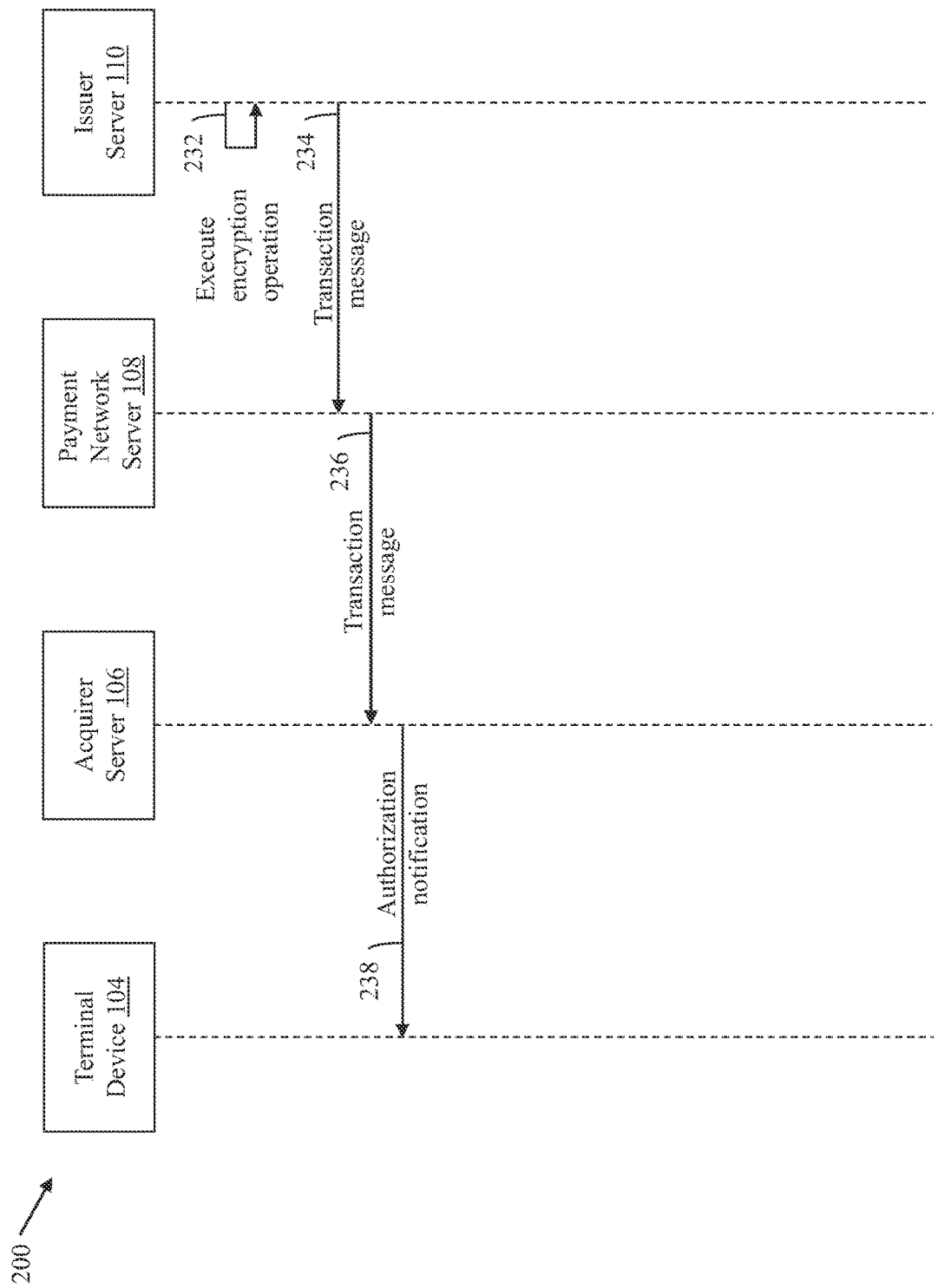

FIGS. 2A, 2B, and 2C, collectively represent a process flow diagram 200 that illustrates an exemplary scenario for facilitating data security for transaction data, in accordance with an exemplary embodiment of the present disclosure. The process flow diagram 200 involves the terminal device 104, the acquirer server 106, the payment network server 108, and the issuer server 110.

The user 102 may initiate a transaction using the transaction card at the terminal device 104 (as shown by arrow 202). Examples of the transaction may include a funds transfer request, a purchase transaction, a cash withdrawal transaction, a cash deposit transaction, an enquiry request, or the like. The terminal device 104 may generate a transaction message based on the initiation of the transaction (as shown by arrow 204). The transaction message may follow a standard message format and may include multiple fields. Examples of the fields may include, but are not limited to, a message type indicator (MTI), primary and secondary bitmaps, and a plurality of data elements. Messaging formats for transaction messages and significance of fields included in each message format will be known to those of skill in the art. In a non-limiting example, it is assumed that the transaction message conforms to the ISO8583 message format.

The MTI may be indicative of various details pertinent to the transaction message such as, but not limited to, a version of the transaction message, a class of the transaction message, a function of the transaction message, and an originator of the transaction message. The MTI may be a 4-digit decimal code that is read from left to right. The first through fourth digits of the MTI may represent the version, the class, the function, and the originator of the transaction message, respectively. In one example, the value of the MTI may be '0100'. The first digit '0' indicates that the transaction message conforms to 1987 version of the ISO8583 message format. The second digit '1' indicates that the transaction message pertains to authorization of the transaction. The third digit '0' indicates that the transaction message is a 'request'. The fourth digit '0' indicates that the acquirer is the originator of the transaction message. Likewise, the MTI may have any other value depending upon the version, the class, the function, and the originator of the transaction message.

As per the ISO8583 message format, the transaction message includes first through one ninety second data elements DE1-DE192 (i.e., the plurality of data elements) for indicating the transaction data of the transaction. For example, the second data element DE2 indicates a transaction card number of the transaction card used for initiating the transaction. The fourteenth data element DE14 indicates an expiry date of the transaction card. The thirty fifth data element DE35 indicates 'Track 2' data associated with the transaction card. The fifty second data element DE52 indicates a personal identification number (PIN) entered by the user 102 while initiating the transaction. Likewise, the other data elements may further indicate remaining transaction data pertinent to the transaction such as, but not limited to, the transaction amount of the transaction, the merchant category code of the first merchant, a timestamp indicative of a time-instant at which the transaction is initiated, or the like. In a non-limiting example, it is assumed that only first through one twenty eighth data elements DE1-DE128 are used for representing the transaction data and one twenty ninth through one ninety second data elements DE129-DE192 are unused.

The primary bitmap in the transaction message may be mapped to the first through sixty fourth data elements DE1-DE64 and the secondary bitmap in the transaction message may be mapped to the sixty fifth through one twenty eighth data elements DE65-DE128. The primary and secondary bitmaps may, collectively, indicate whether the first through one twenty eighth data elements DE1-DE128 of the transaction message store any transaction data of the transaction. Each of the primary and secondary bitmaps may be an 8-byte (i.e., 64 bit) field such that each bit of the primary and secondary bitmaps may be mapped to a corresponding data element of the first through one twenty eighth data elements DE1-DE128. In other words, each bit of the primary and secondary bitmaps may indicate whether the corresponding data element is being used in the transaction message (i.e., whether the corresponding data element stores any transaction data or not). When a data element in the transaction message is used for storing transaction data, a bit corresponding to the data element in the primary or secondary bitmap is set to '1'. Thus, based on the primary or secondary bitmaps, data elements that store transaction data may be identified. For example, a value of the primary bitmap may be '22 00 00 00 00 00 00 00' (expressed in hexadecimal format). '22' in the primary bitmap translates to '0010 0010' in binary format and corresponds to the first through eighth data elements DE1-DE8. In '0010 0010' (when read from left to right), the third and the seventh bits are set to '1', which implies the use of the third and seventh data elements DE3 and DE7 to store the transaction data.

The terminal device 104 may communicate the transaction message to the acquirer server 106 (as shown by arrow 206). The acquirer server 106 may identify a set of data elements that are to be in a state of compliance with the set of rules, i.e., the PCI DSS (as shown by arrow 208). The acquirer associated with the acquirer server 106 may discern the PCI DSS from relevant sources (e.g., journals, websites, technical specifications, or the like). The acquirer server 106 may store the PCI DSS (i.e., the set of rules) in a memory of the acquirer server 106. Method of discerning the PCI DSS from the various sources will be well known to those of skill in the art. For the sake of brevity, it is assumed that the second, fourteenth, thirty fifth, and fifty second data elements DE2, DE14, DE35, and DE52 are identified as the set of data elements by the acquirer server 106. In other words, the acquirer server 106 identifies that the second, fourteenth, thirty fifth, and fifty second data elements DE2, DE14, DE35, and DE52, storing the transaction card number, the expiry date, the track 2 data, and the PIN, respectively, are required to be in the state of compliance with the PCI DSS. It will be apparent to those of skill in the art that, in actual implementation, the acquirer server 106 may identify many other data elements that are required to be in the state of compliance.

Based on the identification, the acquirer server 106 may select and modify one unused or reserved data element from the plurality of data elements to include a bitmap, i.e., a PCI bitmap (as shown by arrow 210). The PCI bitmap is mapped to the second, fourteenth, thirty fifth, and fifty second data elements DE2, DE14, DE35, and DE52 that are required to be in the state of compliance with the PCI DSS. The data element that is to be modified is different from the identified set of data elements (i.e., exclusive of the set of data elements). In a non-limiting example, the data element selected by the acquirer server 106 for modification is a reserved data element, i.e., a data element reserved for future use or private use according to ISO8583 message format. For example, the acquirer server 106 may select the one twenty sixth data element DE126 for modification. Following the selection, the acquirer server 106 may modify the one twenty sixth data element DE126 to include the PCI bitmap. The PCI bitmap indicates that the second, fourteenth, thirty fifth, and fifty second data elements DE2, DE14, DE35, and DE52 are to be in the state of compliance with the PCI DSS. The PCI bitmap may be an 8-byte field (i.e., a 64-bit field) representative of the first through sixty fourth data elements DE1-DE64. In other words, the first through sixty fourth bits in the PCI bitmap are mapped to the first through sixty fourth data elements DE1-DE64, respectively.

For indicating the second, fourteenth, thirty fifth, and fifty second data elements DE2, DE14, DE35, and DE52 that need comply with the PCI DSS, the second, fourteenth, thirty fifth, and fifty second bits in the PCI bitmap are set to '1'. The remaining bits in the PCI bitmap have a value '0' to indicate that corresponding data elements need not be in the state of compliance with the PCI DSS. In an alternate embodiment, each of the second, fourteenth, thirty fifth, and fifty second bits of the PCI bitmap may be set to '0' and the remaining bits of the PCI bitmap may be set to '1'.

Following the modification of the one twenty sixth data element DE126, the acquirer server 106 may modify the secondary bitmap to indicate that the one twenty sixth data element DE126 is used to store data. The acquirer server 106 may further modify the second, fourteenth, thirty fifth, and fifty second data elements DE2, DE14, DE35, and DE52 to ensure that they are in the state of compliance with the PCI DSS (as shown by arrow 212). For example, the acquirer server 106 may execute a masking operation, an encryption operation, and/or an obfuscation operation to mask, encrypt, and/or obfuscate the second, fourteenth, thirty fifth, and fifty second data elements DE2, DE14, DE35, and DE52. In one embodiment, the acquirer server 106 may execute different modification operations on different data elements. For example, the acquirer server 106 may execute the masking operation to mask the second data element DE2, the encryption operation to encrypt the fourteenth data element DE14, and the obfuscation operation to obfuscate the thirty fifth and fifty second data elements DE35 and DE52. For the sake of brevity, it is assumed that the acquirer server 106 encrypts the second, fourteenth, thirty fifth, and fifty second data elements DE2, DE14, DE35, and DE52.

Consequently, the acquirer server 106 may communicate the transaction message having the modified one twenty sixth data element DE126 to the payment network server 108 for processing (as shown by arrow 214). Based on the secondary bitmap in the received transaction message, the payment network server 108 may determine that the one twenty sixth data element DE126 includes the PCI bitmap. Based on the PCI bitmap, the payment network server 108 may identify that the second, fourteenth, thirty fifth, and fifty second data elements DE2, DE14, DE35, and DE52 (i.e., the set of data elements) are to be in the state of compliance with the PCI DSS (as shown by arrow 216). The payment network server 108 may execute a decryption operation to decrypt the second, fourteenth, thirty fifth, and fifty second data elements DE2, DE14, DE35, and DE52 for processing the transaction (as shown by arrow 218). Upon decryption, the payment network server 108 may process the transaction (as shown by arrow 220). For example, based on an issuer identification number in the transaction message, the payment network server 108 may identify the issuer corresponding to the transaction. The payment network server 108 may further store, in a corresponding memory, a record of the transaction message. The record of the transaction message may include the identified second, fourteenth, thirty fifth, and fifty second data elements DE2, DE14, DE35, and DE52 in an encrypted format to maintain the state of compliance with the PCI DSS. The payment network server 108 may further execute the encryption operation to re-encrypt the identified second, fourteenth, thirty fifth, and fifty second data elements DE2, DE14, DE35, and DE52 (as shown by arrow 222). Following the re-encryption, the payment network server 108 may communicate the transaction message having the PCI bitmap to the issuer server 110 (as shown by arrow 224).

Based on the secondary bitmap in the received transaction message, the issuer server 110 may determine that the one twenty sixth data element DE126 includes the PCI bitmap. Based on the PCI bitmap, the issuer server 110 may identify that the second, the fourteenth, the thirty fifth, and the fifty second data elements DE2, DE14, DE35, and DE52 (i.e., the set of data elements) are to be in the state of compliance with the PCI DSS (as shown by arrow 226). Prior to processing the transaction, the issuer server 110 may execute the decryption operation to decrypt the second, fourteenth, thirty fifth, and fifty second data elements DE2, DE14, DE35, and DE52 (as shown by arrow 228).

Upon decryption, the issuer server 110 may process the transaction (as shown by arrow 230). The issuer server 110 may authorize or decline the transaction. In a non-limiting example, the issuer server 110 authorizes the transaction. Based on the authorization, the issuer server 110 may update the MTI '0100' in the transaction message to '0112' indicating that the transaction message is an authorization response from the issuer server 110. In some embodiments, the issuer server 110 may further modify or update one or more other data elements in the transaction message to represent a result of the authorization. For example, the issuer server 110 may modify a data element to indicate a remaining balance in the payment account of the user 102. In such a scenario, the issuer server 110 may determine whether the data element associated with the remaining balance is to be in the state of compliance with the PCI DSS. If the issuer server 110 determines that the data element associated with the remaining balance needs to comply with the PCI DSS, the issuer server 110 may modify the PCI bitmap. For example, the issuer server 110 may change a value of a bit in the PCI bitmap corresponding to the data element associated with the remaining balance to '1'. The issuer server 110 may execute the encryption operation to encrypt the second, the fourteenth, the thirty fifth, and the fifty second data elements DE2, DE14, DE35, and DE52 and the data element associated with the remaining balance (as shown by arrow 232). The issuer server 110 may communicate the modified transaction message (i.e., the authorization response) to the acquirer server 106 by way of the payment network server 108 (as shown by arrows 234 and 236). Based on the transaction message, the acquirer server 106 may communicate an authorization notification to the terminal device 104, indicating that the transaction is authorized by the issuer (as shown by arrow 238).

It will be apparent to a person of ordinary skill in the art that the acquirer server 106 and the payment network server 108 may process the transaction message indicating the authorization response or any other type of transaction message in a similar manner as described in the foregoing.

In another embodiment, a data element in the set of data elements may include one or more sub-elements for storing transaction data. Each sub-element may typically be expressed in a tag-length-value format. In one exemplary scenario, the set of data elements may further include the forty eighth data element DE48 that has first through one hundredth sub-data elements (i.e., a plurality of sub-elements) therein. The ninety second sub-element of the forty eighth data element DE48 may be used to store a second card verification value (CVC2) of the transaction card. The ninety second sub-element of the forty eighth data element DE48 may be expressed as 'R9203281' (i.e., the tag-length-value format), where 'R92' is a first tag representing the ninety second sub-element, '03' is the length of the second CVC2 '281'. Along with setting the forty eighth bit in the PCI bitmap corresponding to the forty eighth data element DE48 to '1', the acquirer server 106 may modify the ninety second sub-element of the forty eighth data element DE48 by appending an identifier to the ninety second sub-element. The appended identifier indicates that the ninety second sub-element of the forty eighth data element DE48 is required to be in the state of compliance. The appended identifier may also follow the tag-length-value format. For example, the appended identifier may be 'R50292', where 'R5' may be a second tag and '02' may indicate the length (i.e., '2') of a data value '92'. The acquirer server 106 may append similar identifiers to other sub-elements in the transaction message that needs to comply with the PCI DSS.

It will be apparent to a person of ordinary skill the art that the scope of the disclosure is not limited to the transaction messages related to the transactions performed at the terminal device 104. In another embodiment, the transaction message may correspond to a reconciliation message, an administrative message, a fee collection message, reversal and chargeback messages, or the like generated by any of the acquirer server 106, the payment network server 108, and the issuer server 110.

Figure 3:
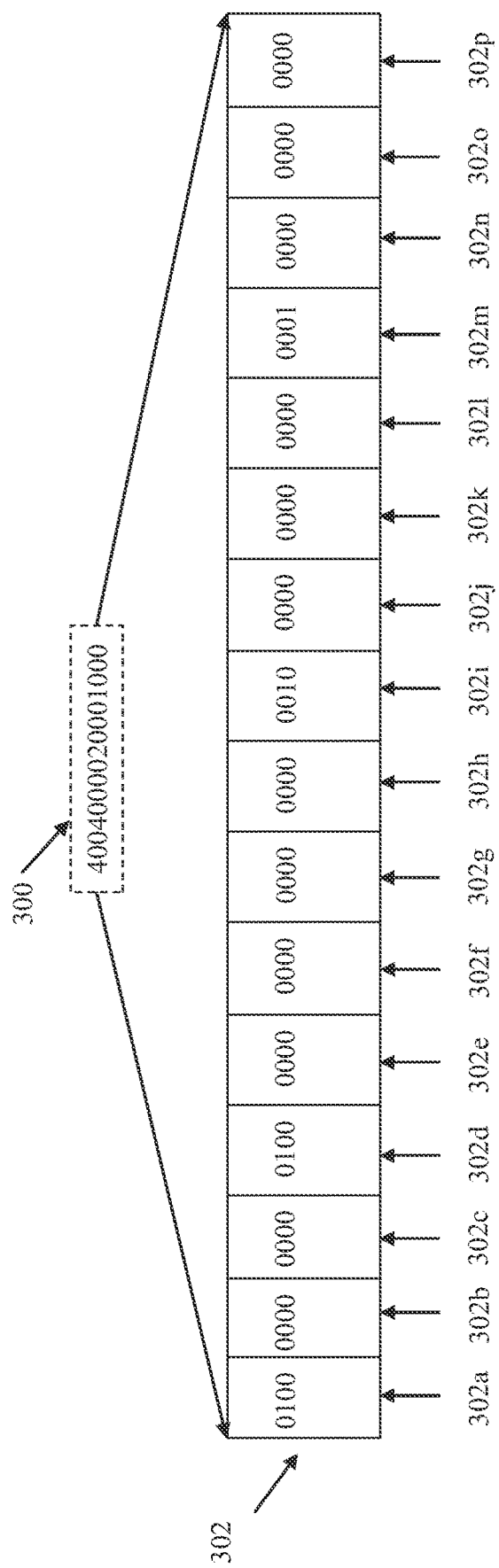
FIG. 3 is a block diagram that illustrates a bitmap included in a transaction message for facilitating data security for transaction data, in accordance with an exemplary embodiment of the present disclosure.

FIG. 3 is a block diagram that illustrates a bitmap 300 (i.e., the PCI bitmap 300) included in the transaction message for facilitating data security for transaction data, in accordance with an exemplary embodiment of the present disclosure. FIG. 3 is explained in conjunction with FIGS. 2A-2C.

The PCI bitmap 300 included in the one twenty sixth data element DE126 is expressed as an 8-byte hexadecimal number (i.e., '4004000020001000') that includes first through sixteenth digits. As will be known by those of skill in the art, each digit of a hexadecimal number represents a nibble (i.e., 4 bits). Thus, the PCI bitmap 300 includes 64 bits (i.e., '16'*'4'='64') as illustrated in Table 302. Table 302, including columns 302a-302p, illustrates binary conversion of the first through sixteenth digits of the PCI bitmap 300. Thus, each column 302a-302p in Table 302 represents the binary conversion of a corresponding hexadecimal digit of the PCI bitmap 300. For example, the column 302a represents the Binary conversion '0100' of the first hexadecimal digit '4' and the column 302p represents the Binary conversion '0000' of the sixteenth hexadecimal digit '0', of the PCI bitmap 300.

In a scenario where the sixty fifth through one twenty eighth data elements DE65-DE128 are also used to store the transaction data, the PCI bitmap 300 may be extended to 16 bytes. However, for the sake of brevity, it is assumed that the transaction data is stored in the first through sixty fourth data elements DE1-DE64, hence, the PCI bitmap 300 includes only 8 bytes, i.e., 64 bits.

The first through sixty fourth bits (as illustrated in Table 302) of the PCI bitmap 300 are mapped to the first through sixty fourth data elements DE1-DE64, respectively, to indicate whether a corresponding data element needs to comply with the PCI DSS. For example, the column 302a includes the first through fourth bits '0100' that are mapped to the first through fourth data elements DE1-DE4. The first through fourth bits '0100' indicate that the first, third, and fourth data elements DE1, DE3, and DE4 do not need to comply with the PCI DSS and the second data element DE2 needs to be compliant with the PCI DSS. Likewise, the column 302b illustrates the fifth through eighth bits '0000' that indicate that none of the fifth through eighth data elements DE5-DE8 need to be in the state of compliance. It will be apparent to a person of ordinary skill in the art that the value of the PCI bitmap 300 may change depending upon the requirement of the data elements to comply with the PCI DSS.

Figure 4:
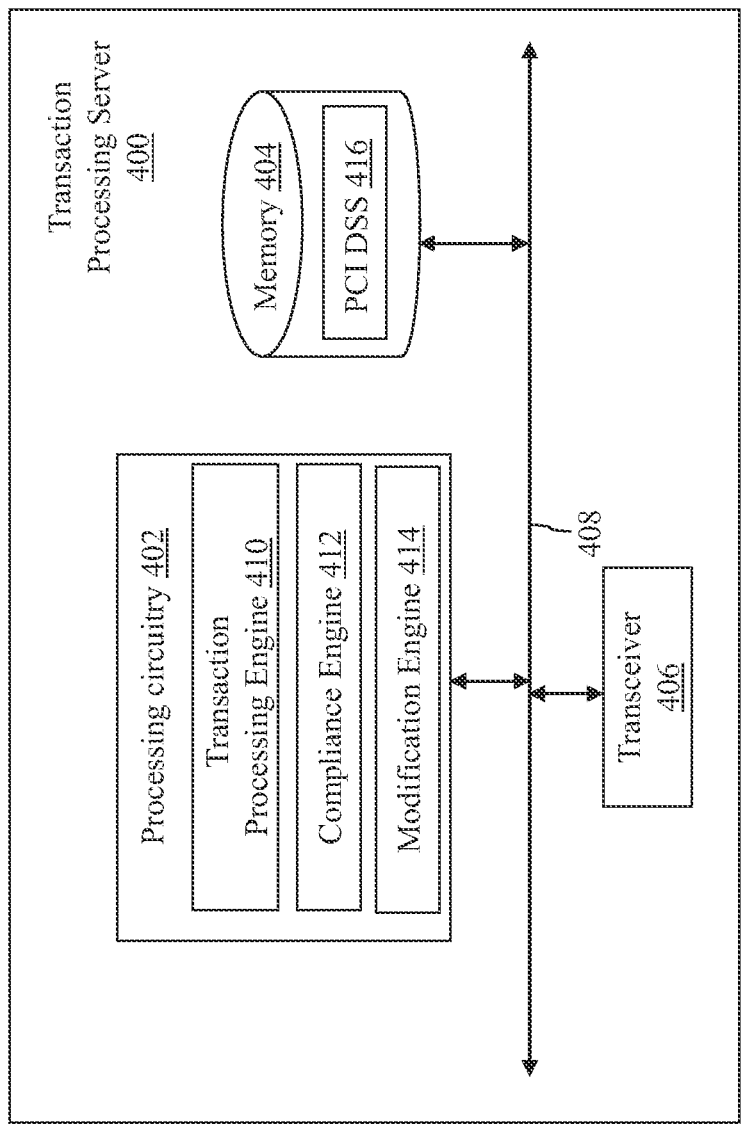
FIG. 4 is a block diagram that illustrates a transaction processing server, in accordance with an exemplary embodiment of the present disclosure.

FIG. 4 is a block diagram that illustrates a transaction processing server 400, in accordance with an exemplary embodiment of the present disclosure. The transaction processing server 400 may be one of the acquirer server 106, the payment network server 108, or the issuer server 110. The transaction processing server 400 may include processing circuitry 402, a memory 404, and a transceiver 406. The processing circuitry 402, the memory 404, and the transceiver 406 may communicate with each other by way of a communication bus 408. The processing circuitry 402 may include a transaction processing engine 410, a compliance engine 412, and a modification engine 414.

The processing circuitry 402 includes suitable logic, circuitry, interfaces, and/or code, executed by the circuitry, to process transaction messages (i.e., e.g., the transaction message) and identify data elements that are to be in the state of compliance with the set of rules (e.g., the PCI DSS). The processing circuitry 402 may be configured to receive the transaction messages, identify those data elements in the transaction messages that are to be compliant with the set of rules, and modify the identified data elements to ensure that the data elements are compliant with the set of rules. The processing circuitry 402 may be further configured identify a data element (e.g., the one twenty sixth data element DE126) that needs to be modified to include the PCI bitmap 300.

Examples of the processing circuitry 402 may include, but are not limited to, an application-specific integrated circuit (ASIC) processor, a reduced instruction set computer (RISC) processor, a complex instruction set computer (CISC) processor, a field programmable gate array (FPGA), and the like. The processing circuitry 402 may execute various transaction processing operations by way of the transaction processing engine 410, the compliance engine 412, and the modification engine 414.

The memory 404 includes suitable logic, circuitry, interfaces, and/or code, executable by the circuitry, to store the set of rules, i.e., the PCI DSS (hereinafter, referred to and designated as 'the PCI DSS 416') for processing transaction messages. In one embodiment, the PCI DSS 416 may be stored in the memory 404. In another embodiment, the processing circuitry 402 may execute one or more operations to discern the PCI DSS 416 from various PCI DSS sources. Examples of the memory 404 may include a random-access memory (RAM), a read-only memory (ROM), a removable storage drive, a hard disk drive (HDD), a flash memory, a solid-state memory, and the like. It will be apparent to a person skilled in the art that the scope of the disclosure is not limited to realizing the memory 404 in the transaction processing server 400, as described herein. In another embodiment, the memory 404 may be realized in form of a database server or a cloud storage working in conjunction with the acquirer server 106, without departing from the scope of the disclosure.

The transaction processing engine 410 may process transaction messages received by the transaction processing server 400. For example, in a scenario where the transaction processing server 400 is the acquirer server 106, the transaction processing engine 410 may process the transaction and identify the payment network server 108 that corresponds to the transaction. Consequently, the transaction processing server 400 may communicate the transaction message to the payment network server 108 (i.e., another transaction processing server). Similarly, in another scenario where the transaction processing server 400 is the payment network server 108, the transaction processing engine 410 may process the transaction and identify the issuer server 110 that corresponds to the transaction. Consequently, the transaction processing server 400 may communicate the transaction message to the issuer server 110 (i.e., other transaction processing server). Similarly, in another scenario where the transaction processing server 400 is the issuer server 110, the transaction processing engine 410 may process the transaction (e.g., authorize the transaction) and communicate the transaction message to the payment network server 108 (i.e., other transaction processing server).

The compliance engine 412 may analyze the PCI DSS 416 and received transaction messages to identify data elements that are to be in the state of compliance with the PCI DSS 416. For example, the compliance engine 412 may identify that the second, fourteenth, thirty fifth, and fifty second data elements DE2, DE14, DE35, and DE52 need to comply with the PCI DSS 416. In an embodiment where the compliance engine 412 receives a transaction message that includes the PCI bitmap 300 indicative of the data elements that are to be in the state of compliance, the compliance engine 412 may verify the PCI bitmap 300 against the PCI DSS 416 to ensure compliance.

The modification engine 414 may modify the set of data elements to ensure that the set of data elements comply with the PCI DSS 416. The modification engine 414 may execute the masking, the encryption, and/or the obfuscation operations to modify the set of data elements for ensuring compliance. The modification engine 414 may further identify and modify the one twenty sixth data element DE126 to include the PCI bitmap 300 to indicate the set of data elements. The modification engine 414 may further execute various operations to decrypt, unmask, or de-obfuscate the set of data elements to process the transaction.

The transceiver 406 may include suitable logic, circuitry, interfaces, and/or code, executable by the circuitry, to transmit and receive data over the communication network 112 using one or more communication network protocols. In one embodiment where the transaction processing server 400 is the acquirer server 106, the transceiver 406 may transmit requests and messages to and receive requests and messages from the terminal device 104 and the payment network server 108. Likewise, in another embodiment where the transaction processing server 400 is the payment network server 108, the transceiver 406 may transmit requests and messages to and receive requests and messages from the acquirer server 106 and the issuer server 110. Likewise, in another embodiment where the transaction processing server 400 is the issuer server 110, the transceiver 406 may transmit requests and messages to and receive requests and messages from the payment network server 108. Examples of the transceiver 406 may include, but are not limited to, an antenna, a radio frequency transceiver, a wireless transceiver, a Bluetooth transceiver, an ethernet port, a universal serial bus (USB) port, or any other device configured to transmit and receive data.

Figure 5A:
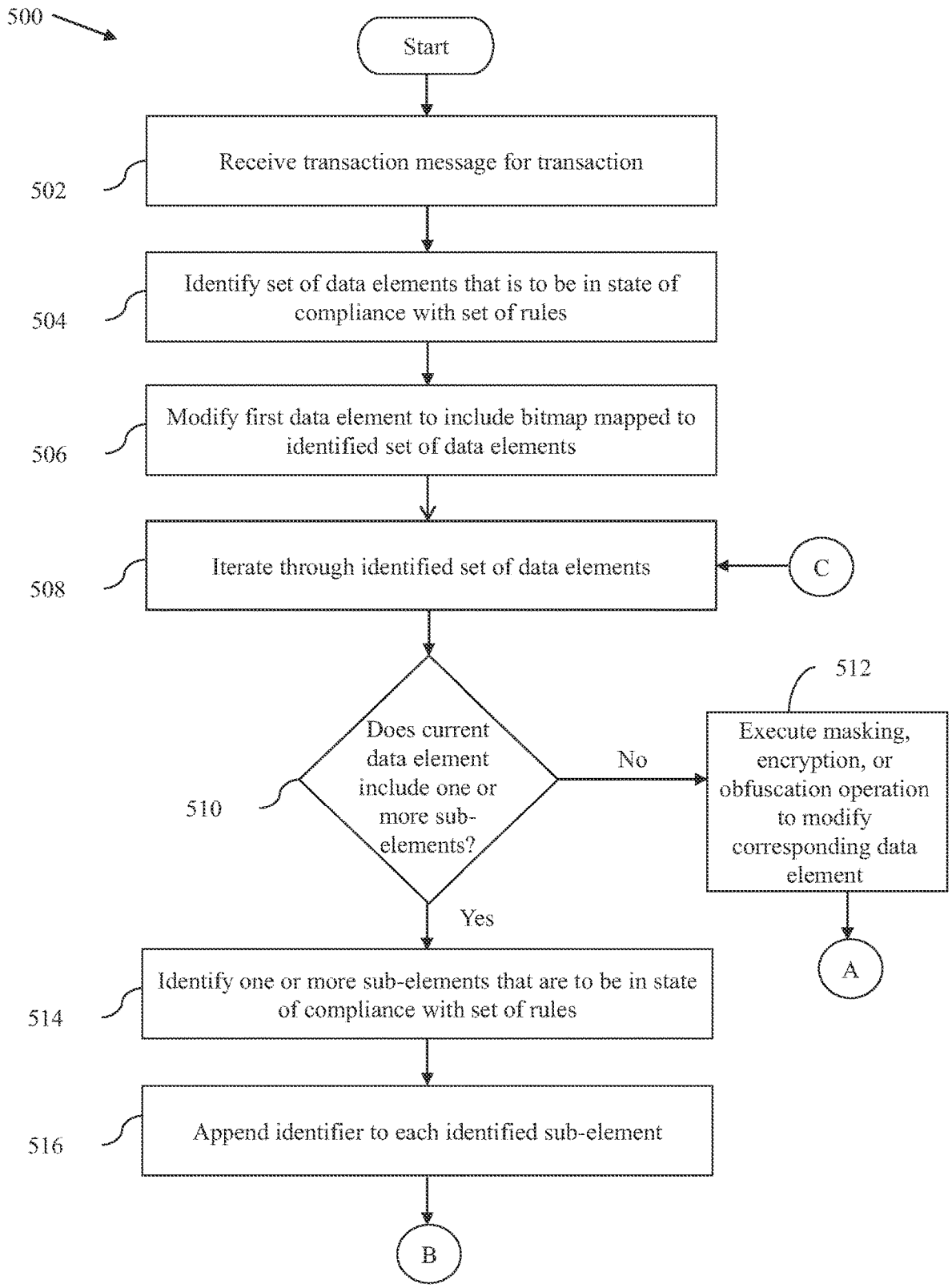
FIGS. 5A and 5B, collectively represent a flow chart that illustrates a method for facilitating data security for transaction data, in accordance with an exemplary embodiment of the present disclosure.
Figure 5B:
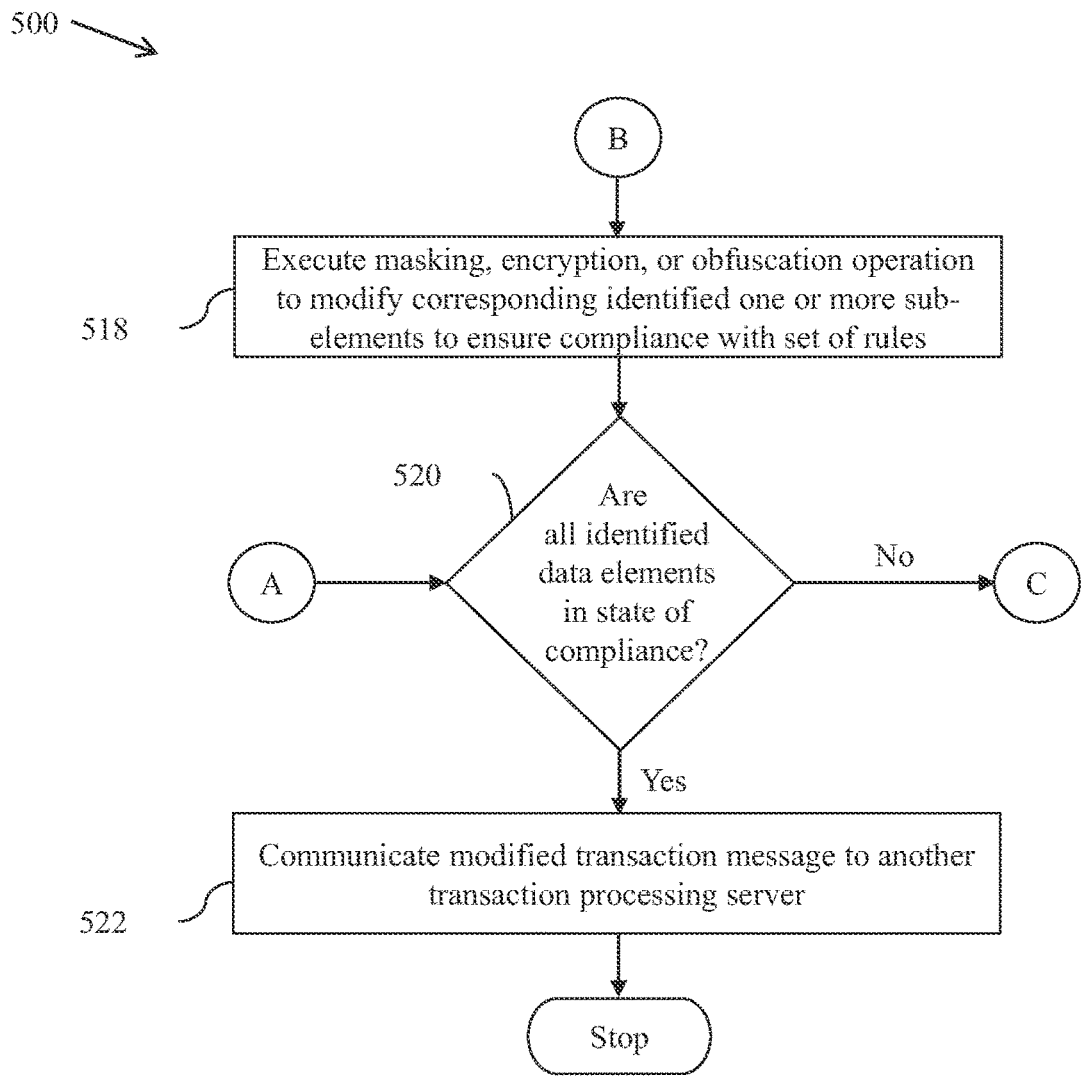

FIGS. 5A and 5B, collectively represent a flow chart 500 that illustrates a method for facilitating data security for transaction data, in accordance with an exemplary embodiment of the present disclosure.

At step 502, the transaction processing server 400 (i.e., a first transaction processing server) may receive a transaction message (e.g., the transaction message) for a transaction. The transaction processing server 400 may be one of the acquirer server 106, the payment network server 108, or the issuer server 110. At step 504, the transaction processing server 400 may identify the set of data elements (e.g., the second, the fourteenth, the thirty fifth, and the fifty second data elements DE2, DE14, DE35, and DE52) that is to be in compliance with the set of rules (e.g., the PCI DSS 416). At step 506, the transaction processing server 400 may modify an unused or reserved first data element (e.g., the one twenty sixth data element DE126) to include a bitmap (e.g., the PCI bitmap 300) mapped to the identified set of data elements. The PCI bitmap 300 may include multiple bits for representing each data element in the transaction message. Those bits in the PCI bitmap 300 that correspond to the identified set of data elements may be set to '1' and the remaining bits in the PCI bitmap 300 may be set to '0'. At step 508, the transaction processing server 400 may iterate through the identified set of data elements. At step 510, for a current data element, the transaction processing server 400 may determine whether the current data element includes one or more sub-elements.

If at step 510, the transaction processing server 400 determines that the current data element does not include any sub-elements, step 512 is performed. At step 512, the transaction processing server 400 executes a masking, an encryption, and/or an obfuscation operation to modify the current data element and ensure that the current data element is in the state of compliance with the set of rules. The process proceeds to step 520. If at step 510, the transaction processing server 400 determines that the current data element includes one or more sub-elements, step 514 is performed. At step 514, for the current data element, the transaction processing server 400 identifies one or more sub-elements that are to be in the state of compliance with the set of rules. At step 516, the transaction processing server 400 may append a unique identifier to each identified sub-element to indicate that the corresponding identified sub-element is to comply with the set of rules (as described in FIGS. 2A-2C).

At step 518, the transaction processing server 400 executes the masking, the encryption, or the obfuscation operation to modify the identified one or more sub-elements and ensure that the identified one or more sub-elements are in compliance with the set of rules. At step 520, the transaction processing server 400 determines whether all the identified set of data elements are in the state of compliance. If at step 520, it is determined that there are remaining data elements to iterate through, step 508 is performed. If at step 520, the transaction processing server 400 determines that all the identified set of data elements are in the state of compliance and there are no remaining data elements to iterate through, step 522 is performed. At step 522, the transaction processing server 400 communicates the transaction message that includes the modified first data element (i.e., the modified one twenty sixth data element DE126) to another transaction processing server (e.g., the acquirer server 106, the payment network server 108, or the issuer server 110) for processing the transaction. The other transaction processing server may identify, based on the modified first data element, the set of data elements that need to comply with the set of rules.

Figure 6:
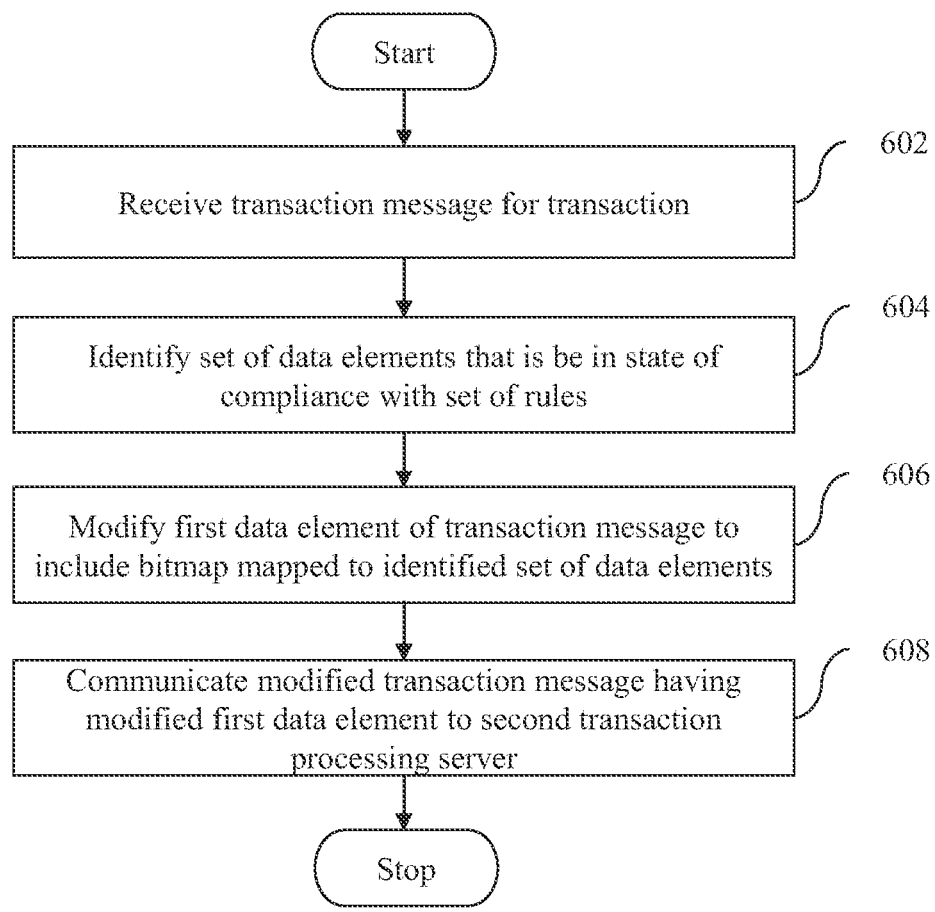
FIG. 6 represents a high-level flow chart that illustrates a method for facilitating data security for transaction data, in accordance with an exemplary embodiment of the present disclosure.

FIG. 6 represents a high-level flow chart 600 that illustrates a method for facilitating data security for transaction data, in accordance with an exemplary embodiment of the present disclosure. At step 602, the transaction processing server 400 (i.e., a first transaction processing server) receives a transaction message for a transaction (e.g., the transaction initiated by the user 102). The transaction processing server 400 may be one of the acquirer server 106, the payment network server 108, or the issuer server 110. The transaction message may include a plurality of data elements (e.g., the first through one ninety second data elements DE1-DE192) that indicate the transaction data of the transaction. At step 604, the transaction processing server 400 identifies a set of data elements (e.g., the second, the fourteenth, the thirty fifth, and the fifty second data elements DE2, DE14, DE35, and DE52) that is to be in the state of compliance with the set of rules (e.g., the PCI DSS 416 or an information technology security standard). At step 606, the transaction processing server 400 modifies a first data element (e.g., the one twenty sixth data element DE126) to include a bitmap (e.g., the PCI bitmap 300) that is mapped to the identified set of data elements. The first data element is exclusive of the set of data elements and the PCI bitmap 300 is indicative of the set of data elements that is to be in the state of compliance with the set of rules. By executing one of a masking operation, an encryption operation, or an obfuscation operation, the transaction processing server 400 modifies the identified set of data elements and ensures that the modified set of data elements complies with the set of rules. At step 608, the transaction processing server 400 communicates the transaction message having the modified first data element (e.g., the modified one twenty sixth data element DE126) to a second transaction processing server (e.g., the acquirer server 106, the payment network server 108, or the issuer server 110). The set of data elements that is to be in the state of compliance with the set of rules is identified by the second transaction processing server based on the modified first data element.

Figure 7:
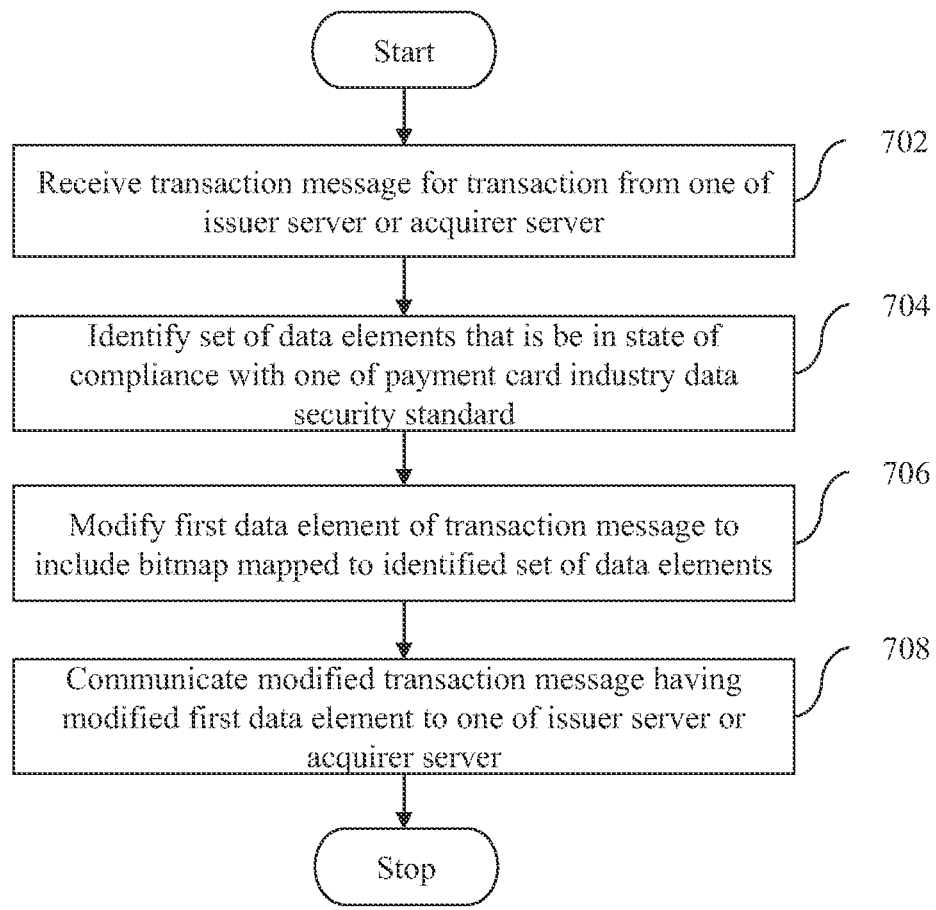
FIG. 7 represents a high-level flow chart that illustrates a method for facilitating data security for transaction data, in accordance with another exemplary embodiment of the present disclosure.

FIG. 7 represents a high-level flow chart 700 that illustrates a method for facilitating data security for transaction data, in accordance with another exemplary embodiment of the present disclosure. At step 702, the payment network server 108 receives a transaction message for a transaction. The transaction message may include a plurality of data elements (e.g., the first through one ninety second data elements DE1-DE192) that indicates the transaction data of the transaction. At step 704, the payment network server 108 identifies a set of data elements (e.g., the second, the fourteenth, the thirty fifth, and the fifty second data elements DE2, DE14, DE35, and DE52) that is to be in the state of compliance with the PCI DSS 416. At step 706, the payment network server 108 modifies a first data element (e.g., the one twenty sixth data element DE126) to include a bitmap (e.g., the PCI bitmap 300) that is mapped to the identified set of data elements. The first data element is exclusive of the set of data elements and the PCI bitmap 300 is indicative of the set of data elements that is to be in the state of compliance with the PCI DSS 416. By executing one of a masking operation, an encryption operation, or an obfuscation operation, the payment network server 108 modifies the identified set of data elements and ensures that the modified set of data elements complies with the PCI DSS 416. At step 708, the payment network server 108 may communicate the transaction message having the modified first data element to another transaction processing server, e.g., one of the acquirer server 106 or the issuer server 110. For example, if the payment network server 108 receives the transaction message from acquirer server 106, the payment network server 108 may communicate the transaction message having the modified first data element to the issuer server 110. In another example, if the payment network server 108 receives the transaction message from issuer server 110, the payment network server 108 may communicate the transaction message having the modified first data element to the acquirer server 106. The set of data elements that is to be in the state of compliance with the PCI DSS 416 is identified by the other transaction processing server (e.g., the acquirer server 106 or the issuer server 110) based on the modified first data element.

Figure 8:
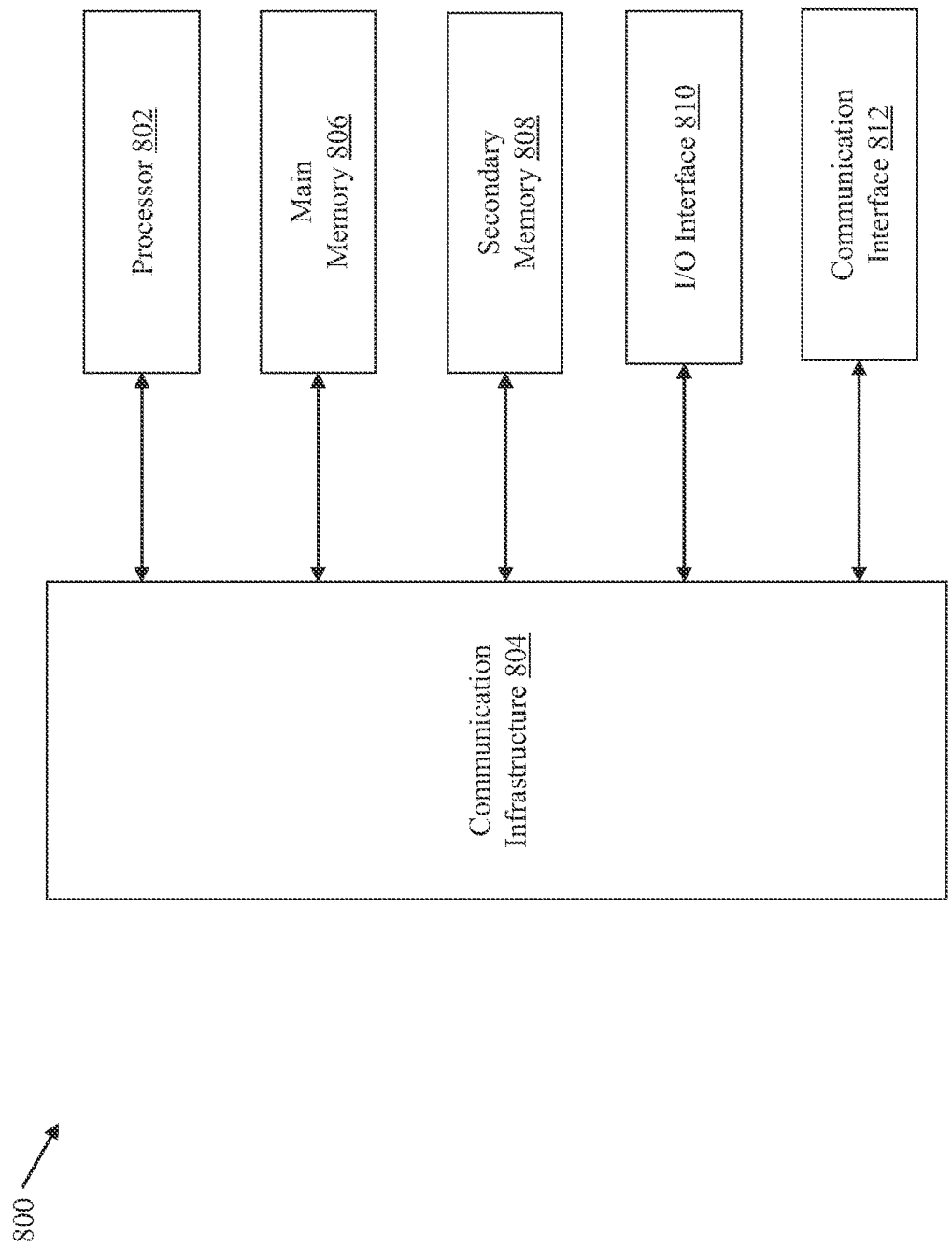
FIG. 8 is a block diagram that illustrates system architecture of a computer system, in accordance with an exemplary embodiment of the present disclosure.

FIG. 8 is a block diagram that illustrates system architecture of a computer system 800, in accordance with an exemplary embodiment of the disclosure. An embodiment of disclosure, or portions thereof, may be implemented as computer readable code on the computer system 800. In one example, the terminal device 104, the acquirer server 106, the payment network server 108, and the issuer server 110 may be implemented as the computer system 800.

Hardware, software, or any combination thereof may embody modules and components used to implement methods of FIGS. 5A-5B, 6, and 7. The computer system 800 includes a processor 802 that may be a special-purpose or a general-purpose processing device. The processor 802 may be a single processor, multiple processors, or combinations thereof. Further, the processor 802 may be connected to a communication infrastructure 804, such as a bus, message queue, multi-core message-passing scheme, and the like. The computer system 800 may further include a main memory 806 and a secondary memory 808. Examples of the main memory 806 may include a RAM, a ROM, and the like. The secondary memory 808 may include an HDD or a removable storage drive, such as a floppy disk drive, a magnetic tape drive, a compact disc, an optical disk drive, a flash memory, and the like.

The computer system 800 further includes an input/output (I/O) interface 810 and a communication interface 812. The I/O interface 810 includes various input and output devices that are configured to communicate with the processor 802. Examples of the input devices may include a keyboard, a mouse, a joystick, a touchscreen, a microphone, and the like. Examples of the output devices may include a display screen, a speaker, headphones, and the like. The communication interface 812 may be configured to allow data to be transferred between the computer system 800 and various devices that are communicatively coupled to the computer system 800. Examples of the communication interface 812 may include a modem, a network interface, i.e., an Ethernet card, a communication port, and the like. Data transferred via the communication interface 812 may correspond to signals, such as electronic, electromagnetic, optical, or other signals as will be apparent to a person skilled in the art.

A person having ordinary skill in the art will appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into digitally any device. For instance, at least one processor such as the processor 802 and a memory such as the main memory 806 and the secondary memory 808 implements the above described embodiments. Further, the operations may be described as a sequential process, however some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Thus, the environment 100 offers a convenient means for facilitating data security for transaction data. The transaction processing server 400 (e.g., the acquirer server 106, the payment network server 108, or the issuer server 110) may identify a set of data elements (e.g., the set of data elements) that are to be in the state of compliance with a set of rules (e.g., the PCI DSS 416) and modify a reserved data element (e.g., the one twenty sixth data element) to indicate the identified set of data elements. This ensures that only a single entity (i.e., the entity operating the transaction processing server 400) has to perform a due diligence of identifying the data elements that needs to be compliant with the PCI DSS 416. Other transaction processing servers (e.g., the second processing server) may simply refer to the modified data element that includes the PCI bitmap 300 to identify the data elements that needs to be in the state of compliance. This allows the other transaction processing server to forgo sub-routines and processes required for identifying the data elements that are to be compliant with the set of rules, thus, facilitating faster processing times for transactions. Implementation of embodiments in the disclosure requires little to no modification in the existing architecture for processing of transaction messages. A reserved data element (e.g., the one twenty sixth data element) may be utilized for including the PCI bitmap 300, leaving an existing message format for transaction messages undisturbed. Thus, the embodiments in the disclosure allow transaction processing servers (e.g., the acquirer server 106, the payment network server 108, and the issuer server 110) to stay compliant with the PCI DSS 416 and/or other guidelines, and significantly improve transaction processing times without any hardware or infrastructure upgrades.

Techniques consistent with the present disclosure provide, among other features, systems and methods for facilitating data security for transaction data. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

In the claims, the words 'comprising', 'including' and 'having' do not exclude the presence of other elements or steps then those listed in a claim. The terms "a" or "an," as used herein, are defined as one or more than one. Unless stated otherwise, terms such as "first" and "second" are used to arbitrarily distinguish between the elements such terms describe. Thus, these terms are not necessarily intended to indicate temporal or other prioritization of such elements. The fact that certain measures are recited in mutually different claims does not indicate that a combination of these measures cannot be used to advantage.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims.

What is claimed is:

1. A method for facilitating data security for transaction data, the method comprising:
   receiving, by a first transaction processing server, a transaction message for a transaction, wherein the transaction message includes a plurality of data elements that are indicative of the transaction data of the transaction;
   identifying, by the first transaction processing server, a set of data elements of the plurality of data elements that is to be in a state of compliance with a set of rules pertaining to a payment card industry data security standard (PCI DSS) or an information technology standard;
   modifying, by the first transaction processing server, a first data element of the plurality of data elements to include a bitmap comprising a plurality of bits, each bit of the plurality of bits mapped to a corresponding data element from among the set of data elements, wherein the first data element is exclusive of the set of data elements, and wherein each bit of the bitmap is indicative of the corresponding data element from among the set of data elements that is to be in the state of compliance with the set of rules;
   performing, based on the corresponding data element that is to be in the state of compliance with the set of rules as indicated in the bitmap, by the first transaction processing server, a security operation on at least a second data element from among the set of data elements to bring the second data element in compliance with the PCI DSS or the information technology standard; and
   communicating, by the first transaction processing server, the transaction message having the modified first data element and the second data element having the security operation performed thereon to a second transaction processing server for processing the transaction, wherein the set of data elements that is to be in the state of compliance with the set of rules is identified by the second transaction processing server based on the modified first data element.

2. The method of claim 1, wherein each of the first and second transaction processing servers is associated with one of an acquirer, an issuer, or a payment network that corresponds to the transaction.

3. The method of claim 1, further comprising modifying, by the first transaction processing server, the identified set of data elements to ensure that the set of data elements is in the state of compliance with the set of rules pertaining to the PCI DSS or the information technology standard.

4. The method of claim 1, wherein performing the security operation further comprising executing, by the first transaction processing server, one of a masking operation, an encryption operation, or an obfuscation operation.

5. The method of claim 1, wherein a second data element in the identified set of data elements includes a plurality of sub-elements.

6. The method of claim 5, further comprising:
   identifying, by the first transaction processing server, for the second data element, one or more sub-elements from the plurality of sub-elements that are to be in the state of compliance with the set of rules; and
   appending, by the first transaction processing server, an identifier to each of the identified one or more sub-elements, wherein the identifier indicates that a corresponding sub-element is to be in the state of compliance with the set of rules.

7. The method of claim 1, wherein the transaction data includes at least a transaction amount of the transaction and a transaction card number of a transaction card used for executing the transaction.

8. A system for facilitating data security for transaction data, the system comprising:
   a first transaction processing server configured to:
      receive a transaction message for a transaction, wherein the transaction message includes a plurality of data elements that are indicative of the transaction data of the transaction;
      identify a set of data elements of the plurality of data elements that is to be in a state of compliance with a set of rules pertaining to a payment card industry data security standard (PCI DSS) or an information technology standard;
      modify a first data element of the plurality of data elements to include a bitmap comprising a plurality of bits, each bit of the plurality of bits mapped to a corresponding data element from among the set of data elements, wherein the first data element is exclusive of the set of data elements, and wherein each bit of the bitmap is indicative of the corresponding data element from among the set of data elements that is to be in the state of compliance with the set of rules;
      perform, based on the corresponding data element that is to be in the state of compliance with the set of rules as indicated in the bitmap, a security operation on at least a second data element from among the set of data elements to bring the second data element in compliance with the PCI DSS or the information technology standard; and
      communicate the transaction message having the modified first data element and the second data element having the security operation performed thereon to a second transaction processing server for processing the transaction, wherein the set of data elements that is to be in the state of compliance with the set of rules is identified by the second transaction processing server based on the modified first data element.

9. The system of claim 8, wherein each of the first and second transaction processing servers is associated with one of an acquirer, an issuer, or a payment network that corresponds to the transaction.

10. The system of claim 8, wherein the first transaction processing server is further configured to modify the identified set of data elements to ensure that the set of data elements is in the state of compliance with the set of rules.

11. The system of claim 10, wherein to perform the security operation, the first transaction processing server is further configured to execute one of a masking operation, an encryption operation, or an obfuscation operation for modifying the identified set of data elements.

12. The system of claim 8, wherein a second data element in the identified set of data elements includes a plurality of sub-elements.

13. The system of claim 12, wherein the first transaction processing server is further configured to:

identify, for the second data element, one or more sub-elements from the plurality of sub-elements that are to be in the state of compliance with the set of rules; and append, an identifier to each of the identified one or more corresponding sub-elements, wherein the identifier indicates that a corresponding sub-element is to be in the state of compliance with the set of rules.

14. The system of claim 8, wherein the transaction data includes at least a transaction amount of the transaction and a transaction card number of a transaction card used for executing the transaction.

15. A method for facilitating data security for transaction data, the method comprising:

receiving, by a payment network server, a transaction message for a transaction, wherein the transaction message includes a plurality of data elements that are indicative of the transaction data of the transaction;

identifying, by the payment network server, a set of data elements of the plurality of data elements that is to be in a state of compliance with a payment card industry data security standard (PCI DSS);

modifying, by the payment network server, a first data element of the plurality of data elements to include a bitmap comprising a plurality of bits, each bit of the plurality of bits mapped to a corresponding data element from among the set of data elements, wherein the first data element is exclusive of the set of data elements, and wherein each bit of the bitmap is indicative of the corresponding data element from among the set of data elements that is to be in the state of compliance with the PCI DSS;

performing, by the payment network server, based on the corresponding data element that is to be in the state of compliance with the set of rules as indicated in the bitmap, a security operation on at least a second data element from among the set of data elements to bring the second data element in compliance with the PCI DSS; and communicating, by the payment network server, the transaction message having the modified first data element and the second data element having the security operation performed thereon to a transaction processing server for processing the transaction, wherein the set of data elements that is to be in the state of compliance with the PCI DSS is identified by the transaction processing server based on the modified first data element.

16. The method of claim 15, further comprising modifying, by the payment network server, the identified set of data elements to ensure that the set of data elements is in the state of compliance with the PCI DSS.

17. The method of claim 15, wherein the transaction processing server is one of an issuer server or an acquirer server, and wherein a second data element in the identified set of data elements includes a plurality of sub-elements.

18. The method of claim 17, further comprising:

identifying, by the payment network server, for the second data element, one or more sub-elements from the plurality of sub-elements that are to be in the state of compliance with the PCIDSS; and appending, by the payment network server, an identifier to each of the identified one or more sub-elements, wherein the identifier indicates that a corresponding sub-element is to be in the state of compliance with the PCI DSS.

* * * * *